(12) United States Patent
Bishop et al.

(10) Patent No.: US 11,743,303 B2
(45) Date of Patent: *Aug. 29, 2023

(54) SYSTEMS AND METHODS FOR REMOTE CONTROL IN INFORMATION TECHNOLOGY INFRASTRUCTURE

(71) Applicant: ConnectWise, LLC., Tampa, FL (US)

(72) Inventors: Jeff Bishop, Tampa, FL (US); Jake Morgan, Tampa, FL (US)

(73) Assignee: ConnectWise, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,688

(22) Filed: Jul. 12, 2021

(65) Prior Publication Data

US 2022/0182423 A1    Jun. 9, 2022

Related U.S. Application Data

(63) Continuation of application No. 16/183,517, filed on Nov. 7, 2018, now Pat. No. 11,063,989.
(Continued)

(51) Int. Cl.
*H04L 9/40* (2022.01)
*H04L 65/1069* (2022.01)
(Continued)

(52) U.S. Cl.
CPC ...... *H04L 65/1069* (2013.01); *G06F 16/9558* (2019.01); *H04L 63/10* (2013.01);
(Continued)

(58) Field of Classification Search
CPC ..... H04L 65/1069; H04L 63/10; H04L 69/18; H04W 12/08
See application file for complete search history.

(56) References Cited

U.S. PATENT DOCUMENTS 10,057,626 B2    8/2018    Borsum et al.
2009/0033736 A1*   2/2009   Thomason ............. H04N 7/147
                                                    348/14.02
(Continued)

OTHER PUBLICATIONS

Bekker, Scott "ConnectWise Marshals Smartphone Cams to Enlist Users in THeir Own Support" 1996-2018.
(Continued)

*Primary Examiner* — Nelson S. Giddins
(74) *Attorney, Agent, or Firm* — Foley & Lardner LLP

(57) ABSTRACT

Remote control to facilitate the management, configuration, or maintenance of information technology infrastructure is provided. The system activates a real-time communication session and a code for the real-time communication session. The system generates a link with an indication of the code for the real-time communication session. The system transmits the link to a mobile telecommunications device that launches a web browser to request content. The system receives the request for content, and obtains access to data from a sensor of the mobile telecommunications device. The system identifies the real-time communication session corresponding to the code. The system establishes, via a web socket over a network protocol, the real-time communication session with a data feed from the sensor. The system provides, based on at least a portion of the data feed, a command to control the mobile telecommunications device.

18 Claims, 9 Drawing Sheets

Related U.S. Application Data

(60) Provisional application No. 62/582,833, filed on Nov. 7, 2017.

(51) Int. Cl.

| | | |
|---|---|---|
| *H04L 67/02* | (2022.01) | |
| *H04L 67/146* | (2022.01) | |
| *H04L 65/75* | (2022.01) | |
| *H04N 23/69* | (2023.01) | |
| *H04N 23/661* | (2023.01) | |
| *G06F 16/955* | (2019.01) | |
| *H04L 69/18* | (2022.01) | |
| *H04W 12/08* | (2021.01) | |
| *G06F 3/04817* | (2022.01) | |

(52) U.S. Cl.
CPC ............ *H04L 65/765* (2022.05); *H04L 67/02* (2013.01); *H04L 67/146* (2013.01); *H04L 69/18* (2013.01); *H04N 23/661* (2023.01); *H04N 23/69* (2023.01); *H04W 12/08* (2013.01); *G06F 3/04817* (2013.01)

(56) References Cited

U.S. PATENT DOCUMENTS

| | | | |
|---|---|---|---|
| 2012/0066355 A1 | 3/2012 | Tiwari et al. | |
| 2013/0066355 A1 | 3/2013 | Smith | |
| 2013/0198629 A1 | 8/2013 | Tandon et al. | |
| 2013/0208075 A1 | 8/2013 | Lu et al. | |
| 2015/0067035 A1* | 3/2015 | Sullad | H04L 67/08 709/203 |
| 2016/0173825 A1 | 6/2016 | Polyakov et al. | |
| 2016/0234522 A1 | 8/2016 | Lu et al. | |
| 2016/0241865 A1 | 8/2016 | Malone | |
| 2016/0330266 A1* | 11/2016 | Bakhmutov | H04L 67/025 |
| 2016/0379330 A1 | 12/2016 | Powers et al. | |
| 2017/0061567 A1 | 3/2017 | Lim et al. | |
| 2017/0111421 A1 | 4/2017 | Schmidt et al. | |
| 2017/0195392 A1* | 7/2017 | Elad | H04L 67/141 |
| 2017/0195394 A1* | 7/2017 | Kothari | H04L 65/1069 |
| 2018/0018508 A1 | 1/2018 | Tusch | |
| 2019/0268472 A1 | 8/2019 | Amir et al. | |

OTHER PUBLICATIONS

Conctactless Visual Customer Engagement For the New Reality, Forrester Webinar, "5 Key Takeaways for Service Leaders in 2021", Feb. 24, 2021.

Foreign Search Report on PCT PCT/US2018/059685 dated May 22, 2020.

International Search Report and Written Opinion on PCTUS2018/059685 dated Apr. 17, 2019.

Non-Final Office Action on U.S. Appl. No. 16/183,517 dated Oct. 1, 2020.

Non-Final Office Action on U.S. Appl. No. 16/183,525 dated Apr. 9, 2020.

Non-Final Office Action on U.S. Appl. No. 17/360,908 dated Mar. 28, 2022.

Notice of Allowance on U.S. Appl. No. 16/183,517 dated Jan. 19, 2021.

Notice of Allowance on U.S. Appl. No. 16/183,517 dated Mar. 10, 2021.

Notice of Allowance on U.S. Appl. No. 16/183,525 dated Mar. 1, 2021.

Notice of Allowance on U.S. Appl. No. 16/183,525 dated Aug. 3, 2020.

Notice of Allowance on U.S. Appl. No. 16/183,525 dated Nov. 12, 2020.

Notice of Allowance on U.S. Appl. No. 17/360,908 dated Sep. 14, 2022.

* cited by examiner

SYSTEMS AND METHODS FOR REMOTE CONTROL IN INFORMATION TECHNOLOGY INFRASTRUCTURE

CROSS-REFERENCES TO RELATED APPLICATIONS

This application claims the benefit of priority under 35 U.S.C. § 120 as a continuation of U.S. patent application Ser. No. 16/183,517, filed Nov. 7, 2018, which claims the benefit of priority under 35 U.S.C. § 119 to U.S. Provisional Patent Application No. 62/582,833, filed Nov. 7, 2017, each of which is hereby incorporated by reference herein in its entirety.

FIELD OF THE DISCLOSURE

The present disclosure generally relates to providing remote control capabilities in information technology infrastructure. In particular, systems and methods of the present disclosure can provide remotely control capabilities to facilitate the management, configuration, or maintenance of information technology infrastructure.

BACKGROUND OF THE DISCLOSURE

Information technology infrastructure can include computing devices, networking devices, peripherals, accessories, or other devices that are connected to the network. Devices can malfunction or fail from time-to-time. However, due to the large number of devices, their remote location, the various types of devices, it can be challenging to actively monitor and manage the devices to efficiently remedy or address a malfunction or failure.

SUMMARY OF THE DISCLOSURE

Systems and methods of the present disclosure are directed to providing remote control capabilities in information technology infrastructure. In particular, systems and methods of the present disclosure can provide remotely control capabilities to facilitate the management, configuration, or maintenance of information technology infrastructure.

At least one aspect is directed to a system that includes a local computing device having one or more sensors. The local computing device can be physically proximate to information technology infrastructure or devices that are being managed. For example, a local support technician can bring the local computing device to a networking room in which networking devices, routers, servers, or other information technology equipment is present. The one or more sensors can include, for example, a camera that can capture image or video information about the networking room. The local computing device can convert the captured image data using a video protocol and transmit data packets carrying the image or video information. The local computing device can transmit the data packets to a remote computing device.

The remote computing device can provide the captured image data via a graphical user interface to a remote technician, who may have greater expertise in provide information technology support relative to the local support technician. The remote computing device can include, execute, interface with or access a remote view system or component ("RVS"). The RVS can receive instructions from the remote computing device, translate the instructions, and transmit the instructions to the local computing device for execution by the local computing device or the local technician controlling an aspect of the local computing device or the one or more sensors of the local computing device.

The RVS can receive instructions, indications, gestures, or other control information from the remote computing device. The RVS can convert the instructions using one or more policies, heuristics, or rules. The RVS can overlay the instructions onto a communication channel used to provide a real-time video feed from the local computing device to the remote computing device (e.g., via the RVS).

At least one aspect is directed to a system to manage information technology infrastructure. The system can include a remote view system comprising one or more processors and memory. The system can include a session controller. The remote view system can activate a real-time communication session and a code for the real-time communication session. The remote view system can generate a link comprising an indication of the code for the real-time communication session. The remote view system can identify an identifier of a mobile telecommunications device remote from the remote view system. The remote view system can identify the identifier via a lookup in a database using the code. The remote view system can transmit, using the identifier and via a network, the link to the mobile telecommunications device. The mobile telecommunications device can display an indication of the link via a display device of the mobile telecommunications device. The mobile telecommunications device can receive, via an input interface of the mobile telecommunications device, a selection of the link. The mobile telecommunications device can launch a web browser to request content provided via the link. The remote view system can receive, responsive to the selection of the link, the request for content from the mobile telecommunications device. The request can indicate the code embedded in the link. The remote view system can obtain, responsive to the selection, access to data of a sensor of the mobile telecommunications device. The remote view system can identify, via a lookup in the database using the code, the real-time communication session corresponding to the code. The remote view system can establish, via a web socket over a network protocol, the real-time communication session with a data feed from the sensor. The remote view system can provide, based on at least a portion of the data feed, a command to control the mobile telecommunications device.

In some embodiments, the remote view system can transmit the link via a short message service protocol. The remote view system can provide the command comprising an icon indicating a direction to move the mobile telecommunications device. The remote view system can provide the command including an icon indicating to zoom in on an object.

The remote view system can identify a remote support technician device. The remote view system can generate the code to pair the mobile telecommunications device with the remote support technician device. The remote view system can store, in an index, the code for the real-time communication session and an indication of the remote support technician paired with the mobile telecommunications device. The code can include a numerical code and be embedded in the link.

The mobile telecommunication device can, responsive to selection of the link, call an application programming interface that provides a prompt for display on the mobile telecommunications device. The prompt can request authorization to access the sensor of the mobile telecommunications device.

The remote view system can select a server to manage the real-time communication session. The remote view system can relay the data feed between the sensor of the mobile telecommunications device and the remote support technician device via the selected server.

The remote view system can establish the real-time communication session with the data feed between the mobile telecommunications device and the remote support technician device absent a relay between a server of the remote view system. For example, the mobile telecommunications device and the remote support technician can establish a peer-to-peer connection to establish the real-time communication session with the data feed.

The remote view system can add the remote support technician device to the real-time communication session via the web socket over the network protocol.

At least one aspect is directed to a method of managing information technology infrastructure. The method can include the remote view system activating a real-time communication session and a code for the real-time communication session. The method can include the remote view system generating a link including an indication of the code for the real-time communication session. The method can include the remote view system identifying, via a lookup in a database using the code, an identifier of a mobile telecommunications device remote from the remote view system. The remote view system can transmit, using the identifier, via a network, the link to the mobile telecommunications device. The mobile telecommunications device can display an indication of the link via a display device of the mobile telecommunications device. The mobile telecommunications device can receive, via an input interface of the mobile telecommunications device, a selection of the link. The mobile telecommunications device can launch a web browser to request content provided via the link. The remote view system can receive, responsive to the selection of the link, the request for content from the mobile telecommunications device, the request indicating the code embedded in the link. The remote view system can obtain, responsive to the selection, access to a sensor of the mobile telecommunications device. The remote view system can identify, via a lookup in the database using the code, the real-time communication session corresponding to the code. The remote view system can establish, via a web socket over a network protocol, the real-time communication session with a data feed from the sensor. The remote view system can provide, based on at least a portion of the data feed, a command to control the mobile telecommunications device.

At least one aspect is directed to a system to manage information technology infrastructure. The system can include a remote view system comprising one or more processors and memory. The remote view system can establish, responsive to a request to access a link via a web browser executed by a mobile telecommunications device, via a web socket over a network protocol, a real-time communication session between the mobile telecommunications device and a remote support technician device. The real-time communication session can include a plurality of data frames comprising data detected by a sensor of the mobile telecommunications device. The remote view system can receive, via the real-time communication session, the plurality of data frames. Each of the plurality of data frames can include a predetermined plurality of pixels encoded with metadata associated with one or more sensors of the mobile telecommunications device. The remote view system can remove the predetermined plurality of pixels from each of the plurality of data frames. The remote view system can provide, to the remote technician device, the plurality of data frames for rendering based on the metadata encoded in the predetermined plurality of pixels. The plurality of data frames can be rendered without the predetermined plurality of pixels.

In some embodiments, a script executing within a browser executed by the mobile telecommunications device requests, for each frame of the plurality frames, from the one or more sensors of the mobile telecommunications device, the metadata associated with the one or more sensors. The predetermined plurality of pixels can be selected to prevent a compression protocol from removing the predetermined plurality of pixels prior to receipt by the remote view system. The one or more sensors can include at least one of an accelerometer, a location sensor, or a camera depth sensor. The metadata can include at least one of position information, camera depth information, or object detection information.

The remote view system can use the metadata associated with the one or more sensors to stabilize one or more images of the plurality of frames provided rendering on the remote technician device. The remote view system can use the metadata associated with the one or more sensors to generate a three-dimensional environment for the plurality of frames provided for rendering on the remote technician device.

The remote view system can receive, from the remote technician device, an indication to guide a camera of the mobile telecommunications device towards a position. The remote view system can determine, based on the metadata information from the one or more sensors and the position, an instruction to zoom. The remote view system can provide, for display on a display device of the mobile telecommunications device, an icon corresponding to the instruction to zoom.

The remote view system can receive, from the remote technician device, an indication to guide a camera of the mobile telecommunications device. The remote view system can determine, based on the metadata information from the one or more sensors and the position, an instruction to pan. The remote view system can provide, for display on a display device of the mobile telecommunications device, an icon corresponding to the instruction to pan. The metadata encoded in the predetermined plurality of pixels can be different for each of the plurality of frames.

At least one aspect is directed to a method of managing information technology infrastructure. The method can include establishing, by a remote view system comprising one or more processors and memory, responsive to a request to access a link via a web browser executed by a mobile telecommunications device, via a web socket over a network protocol, a real-time communication session between the mobile telecommunications device and a remote support technician device. The real-time communication session can include a plurality of data frames comprising data detected by a sensor of the mobile telecommunications device. The method can include the remote view system receiving, via the real-time communication session, the plurality of data frames. Each of the plurality of data frames can include a predetermined plurality of pixels encoded with metadata associated with one or more sensors of the mobile telecommunications device. The method can include the remote view system removing the predetermined plurality of pixels from each of the plurality of data frames. The method can include the remote view system providing, to the remote technician device, the plurality of data frames for rendering based on the metadata encoded in the predetermined plurality of pixels. The plurality of data frames can be rendered without the predetermined plurality of pixels.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION OF THE DISCLOSURE

Many companies outsource their IT services to outside IT service providers. This can be more economical for the companies because they may not have enough ongoing need to support a full time IT support technician. The IT service provider can share the time of one technician across multiple companies and efficiently provide service to smaller companies in this way. In addition, with economies of scale, an IT service provider can afford to hire technicians with expertise in specific areas and be more efficient in providing service in those areas. IT service providers often use software tools to help manage their own support business, and the tools can help to automate the monitoring, service, and configuration of their customers.

The present disclosure can provide a system that includes a local computing device having one or more sensors. The local computing device can be physically proximate to information technology infrastructure or devices that are being managed. For example, a local support technician can bring the local computing device to a networking room in which networking devices, routers, servers, or other information technology equipment is present. The one or more sensors can include, for example, a camera that can capture image or video information about the networking room. The local computing device can convert the captured image data using a video protocol and transmit data packets carrying the image or video information. The local computing device can transmit the data packets to a remote computing device.

The remote computing device can provide the captured image data via a graphical user interface to a remote technician, who may have greater expertise in provide information technology support relative to the local support technician. The remote computing device can include, execute, interface with or access a remote view system or component ("RVS"). The RVS can receive instructions from the remote computing device, translate the instructions, and transmit the instructions to the local computing device for execution by the local computing device or the local technician controlling an aspect of the local computing device or the one or more sensors of the local computing device.

The RVS can receive instructions, indications, gestures, or other control information from the remote computing device. The RVS can convert the instructions using one or more policies, heuristics, or rules. The RVS can overlay the instructions onto a communication channel used to provide a real-time video feed from the local computing device to the remote computing device (e.g., via the RVS).

Figure 1A:
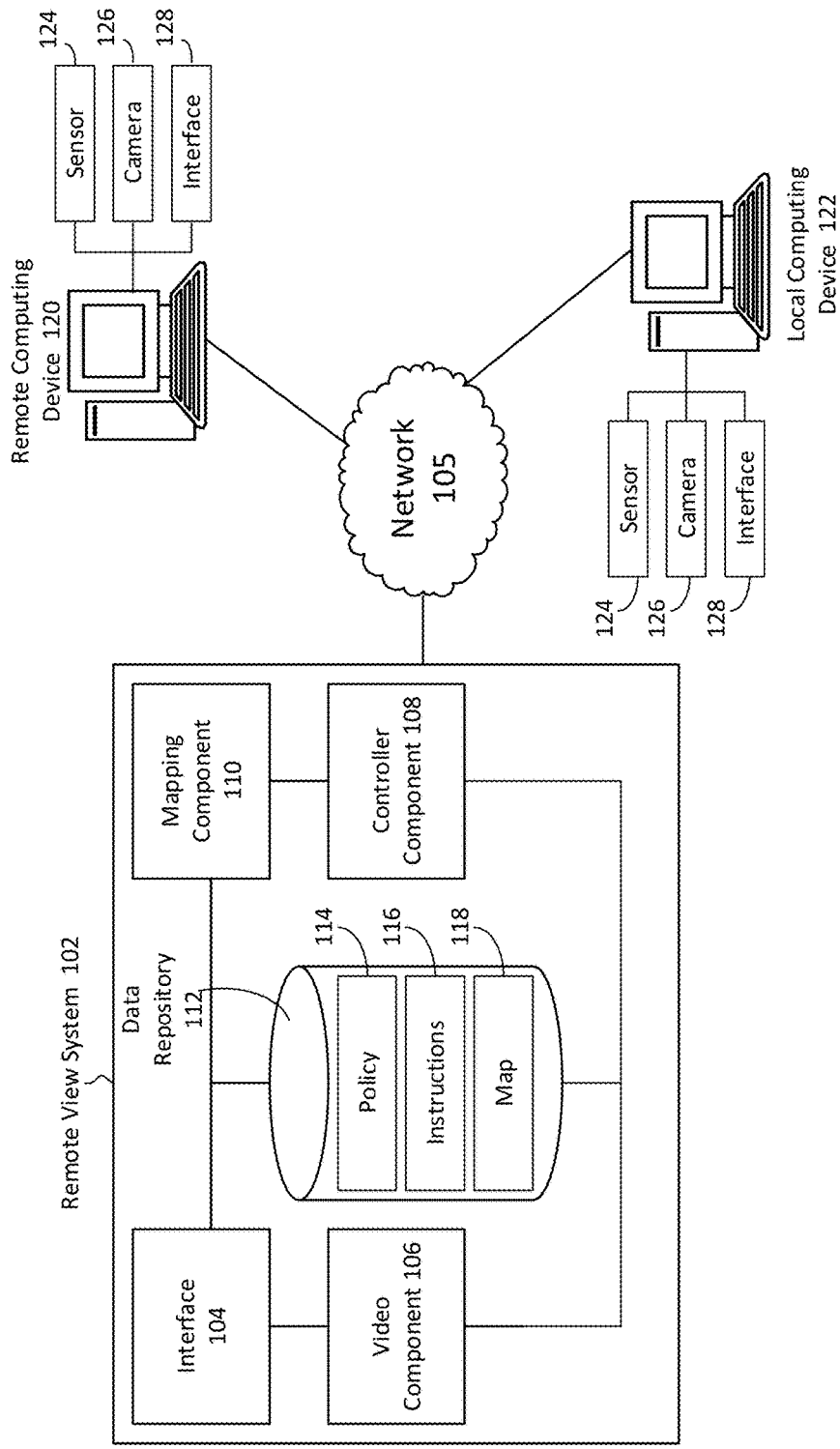
FIG. 1A is an illustrative block diagram of an example embodiment of a system for remote perspective or view and control of information technology infrastructure.

Referring now to FIG. 1A, an illustrative block diagram of an example embodiment of a system for remote control in information technology infrastructure is provided. In brief overview, the system 100 can include a remote view system ("RVS") 102. The RVS can also be referred to as a remote perspective system, or RPS. The system 100 can include, access or interact with one or more of a local computing device 122 and a remote computing device 120. The system 100 can include one or more component or function depicted in FIGS. 3A-3D.

Systems and methods of the present technical solution provide an RVS 102 that can provide technical support for devices with limited or no connectivity. The RVS 102 can provide support for unmanaged devices (e.g., devices that are not managed by a RMM or are executing an agent). The RVS 102 can facilitate diagnosing problems from environmental characteristics that may not be visible through a control interface. The RVS 102 can provide support without the end user having install new applications to add capture of audio from microphone as well as video (along with other sensor data like position and velocity which is already there). The RVS 102 can also facilitate interfacing to a ticketing system. For example, once a diagnosis is completed, the ticketing system can add entries for parts that are to be ordered, and technician time for installing hardware and software.

The remote view system 102 can be executed by one or more servers (e.g., server 306a) or a cloud 308 or on one or more processors (e.g., main processor 321). The RVS 102 can include an interface 104 designed and constructed to communicate with one or more of local computing device 122 or remote computing device 120. The interface 104 can include a port, networking protocol, or application programming interface. The interface 104 can include or provide a graphical user interface.

The system 100 can include, interface with or access a local computing device 122. The local computing device 122 can include, for example, a smartphone, laptop, tablet computing, smartwatch, wearable device, augmented reality device, or virtual reality device. The local computing device 122 can include a telecommunications device. The local computing device 122 can include, access or interface with one or more sensors 124, a camera 126 and an interface 128. The sensors 124 can include, for example, a global positioning system sensor, location sensor, optical sensor, ambient temperature sensor, accelerometer, gyroscope, or near field telecommunication sensor. The camera 126 can include a still image camera or a video camera. The interface 128 can include a display device (e.g., display device 324), a user interface, graphical user interface, input/output ports, or a networking interface. The interface 128 can include input devices such as a keyboard, touchpad, mouse, pointing device, joystick or voice input interface.

The system 100 can include a remote computing device 120. The remote computing device can include one or more of a sensor 124, camera 126 or an interface 128.

The local computing device 122 can be local to an entity, organization, office or location that includes information technology infrastructure that is receive support from an agent or support technician that uses the remote computing device 120. The local computing device 122 can capture images of hardware or software that is being supported or managed by the remote computing device 120.

The RVS 102 can include, interface with or otherwise communication with at least one interface 104, at least one video component 106, at least controller component 108 (or session controller component), at least one mapping component 110, and at least one data repository 112. The data repository 112 can include one or more data structure, data bases, or data files, such as a policy data structure 114, instructions data structure 116, or a map data structure 118.

The interface 104, video component 106, controller component 108, or mapping component 110 can each include at least one processing unit or other logic device such as programmable logic array engine, or module configured to communicate with the database repository 112. The interface 104, video component 106, controller component 108, or mapping component 110 and data repository 112 can be separate components, a single component, or part of the RVS 102. The system 100 and its components, such as a RVS 102, can include hardware elements, such as one or more processors, logic devices, or circuits.

The RVS 102 includes an interface 104. The interface 104 can include any type of interface configured to facilitate communication between one or more component, system or device of system 100. The interface 104 can be configured to facilitate communication or interaction between components or elements of the remote view system 102. The interface 104 can provide a graphical user interface or other user interface to facilitate user interaction with the RVS 102.

The interface 104 can include, communicate with or execute one or more application programming interfaces ("APIs"). The APIs can be configured to interact or interface with a local computing device 122 or a remote computing device 120. The interface 104 can include or utilize one or more cloud application programming interfaces. The interface can include or be based on, for example, a cloud API, Open Cloud Computing Interface ("OCCI"), or representation state transfer ("REST"). Responses and requests can be received or transmitted via the interface 104 using one or more protocol or language, such as, e.g., XML, HTML, JSON, HTTP, or SSL. Responses and requests can be received or transmitted via the interface 104 using one or more protocol or language, such as, e.g., XML, HTML, JSON, HTTP, or SSL.

The RVS 102 can be intermediary to the local computing device 122 and the remote computing device 120. In some cases, the local computing device 122 can interact with the remote computing device 120 directly.

In some cases, the RVS 102 can establish a secure communication session with the remote computing device 120 and the local computing device 122 using credentials, tokens or identifiers. The RVS 102 can undergo a handshaking process with the local computing device 122 or remote computing device 120 to establish the secure communication session. During a secure communication session, the RVS 102 may not need to re-authenticate for each transmission.

The interface 104 can establish a communication channel with the local computing device 122 and the remote computing device 120. The interface 104 can include or utilize a real-time streaming protocol (RTSP), webRTC, real-time transport protocol (RTP) or a real-time transport control protocol (RTCP) to stream media over network 105. RTSP can run over a variety of transport protocols, while RTP and RTCP can run over UDP. The interface 104 or interface 128 can be configured with one or more of the RTSP, RTP or RTCP protocols. The interface 104 or interface 128 can use a video coding format, such as H.264, HEVC, VP8 or VP9.

The RVS 102 can include a video component 106. The video component 106 can utilize the interface 104 to receive a video stream from the camera 126 of the local computing device 122, and forward or transmit the video stream to the remote computing device 120. In some cases, the RVS 102 can transmit additional information to the remote computing device 120 in addition to the video stream. For example, the RVS 102 can overlay additional information associated with the images sensed by the camera 126, modify the video stream to include the additional information, and forward the modified video stream for display via remote computing device 120.

The RVS 102 can include a mapping component 110 designed and constructed to stitch together images obtained by the camera 126. The mapping component 110 can stitch together the images to generate an output video stream that provides a larger view area. The output video stream can be provided to the remote computing device 120.

The remote computing device 120, upon receiving the video stream, can input or provide one or more instructions based on the video stream. For example, the remote computing device 120, via interface 128, can input an instruction to pan or zoom the image or video. The remote computing device 120 can receive the instruction from a user of the remote computing device via interface 128 (e.g., a keyboard input, mouse input, touchpad input, touch screen input, gesture, or voice command). The remote computing device 120 can forward the instruction to the RVS 102.

The RVS 102 can receive the instruction from the remote computing device 120 and process the instruction. For example, the controller component 108 of the RVS 102 can receive the instruction and process the instruction. The controller component 108 can convert the received instruction into a command to provide to the local computing device 122. The controller component 108 can overlay or embed the command in the communication channel established between the local computing device 122 and the interface 104. The controller component 108 can open or establish or utilize a different communication channel to transmit commands to the local computing device 122.

The command can control one or more aspect, attribute, or characteristic associated with the sensor 124 or camera 126. For example, the command provided by the controller component 108 can cause the camera 126 to zoom in. In another example, the command provided by the controller component 108 can include a visual or auditory indication to pan the camera (e.g., instructing a user of the local computing device 122 to move the camera 126 of the local computing device 122 in a direction).

The controller component 108 can receive instructions from the remote computing device and use one or more policy 114 or instructions 116 to determine a type of command to generate and transmit to the local computing device 122. Types of commands can include a command to control the sensor 124 or camera 126 itself (e.g., enable or disable a sensor, retrieve sensor information, adjust a parameter of a sensor, zoom in or zoom out the camera), provide a visual command to a user of the local computing device, or provide an audio command to the local computing device (e.g., sensor 124 can include a speaker or transducer).

The RVS 102 can use one or more types of commands or use commands sequentially based on a policy 114. For example, the RVS 102 can determine that a user of the local computing device 122 did not pan the camera 126 in the direction instructed by the remote computing device 120 (e.g., detected based on a sensor 124 such as a accelerometer observation). If the first command was a visual command (e.g., an arrow displayed via display device of the local computing device 122 or a haptic feedback or an LED or other visual indicator), then the controller component 108 can determine to provide an auditory command to the local computing device 122.

The remote computing device 120 can provide various types of instructions in addition to pan or zoom. For example, the remote computing device 120 can provide instructions to open a cover to a housing that houses components, and capture images of the component for streaming back to the remote computing device 120. The remote computing device 120 can provide instructions to power on a device, for example. The controller component 108 can receive the instruction from the remote computing device 120 and utilize a policy 114 to generate a type of instruction or command to transmit or provide to the local computing device 122 to execute the instruction received from the remote computing device 120.

In some cases, the controller component 108 can include, access or utilize a remote monitoring and management (RMM) system to implement the instruction via an agent executing on the local computing device 122. The RMM can take control of a device identified in the video stream. For example, the RVS can use a mapping component 110 to map an identifier or characteristic of the device to the device identifier, and provide the device identifier to the RMM. The RMM can, via network 105, connect with the device or manage the device. The RMM can update the device in the video stream, or push a configuration to the device in the video stream.

The RVS 102 can include or interface with a ticketing system designed and constructed to generate or manage a service ticket data structure. The ticketing system can provide the service ticket data structure to an electronic board of a customer support system to cause the electronic board to process the service ticket data structure and assign a service ticket to a support agent, such as a support agent that uses the remote computing device 120 to provide instructions to the local computing device 122. The RVS 102 can overlay ticketing information on a display provided to the remote computing device 120 to facilitate the support agent using the remote computing device 120.

The ticketing system can compile, aggregate or otherwise obtain information that can facilitate generating a ticket. A ticket can refer to a ticket data structure that includes information that can facilitate resolving a technical problem associated with hardware or software component at a location of the local computing device 122.

The RVS 102 (e.g., via controller component 108) can activate a real-time communication session and a code for the real-time communication session. The RVS 102 can store the code in the map data structure 118. The code can refer to a numerical code or alphanumeric code. The code can identify the real-time communication session. The code can be stored in an index. The code can be associated or linked with an identifier of a remote technician device (e.g., remote computing device 120). The code can be associated or linked with a local computing device 122 (e.g., a mobile telecommunications device). The local computing device 122 can include, for example, a smart phone, camera, tablet, wearable, smart glasses, or any other device configured to capture images, display or present indications, and transmit data feeds. The code can include or be associated with a key/value pair that maps, pairs or otherwise associates the remote computing device 120 with the local computing device 122.

The RVS 102 can generate a link comprising an indication of the code for the real-time communication session. The link can include, for example, a hyperlink, uniform resource locator, web address, or other pointer. The link can include a domain name of a website, server, or IP address. The link can include the code or other indicator of the real-time communications session. The RVS 102 can identify a remote support technician device and generate the code to pair the mobile telecommunications device with the remote support technician device. The RVS 102 can store, in an index (e.g., map data structure 118), the code for the real-time communication session and an indication of the remote support technician paired with the mobile telecommunications device.

The RVS 102 can identify a local computing device 122 to which to transmit the link or code. The code can be embedded in a link. The RVS 102 can, for example, perform a lookup in the map data structure 118 to identify a phone number, device identifier, username, account number, account identifier, address, or other identifier of the local computing device 122. The RVS 102 can perform the lookup using the code or a key\value pair associated therewith.

The RVS 102 can provide a map display, such as a birds-eye view of all available local computing devices in a geographic area (e.g., physical address, building, zip code, or street) that have a camera. The RVS 102 can provide icons on a digital map indicating the local computing devices 122. The RVS 102 can automatically select a local computing device 122, a remote technician can select the local computing device via the digital map.

Upon identifying the identifier of the mobile telecommunications device (e.g., local computing device 122), the RVS 102 can transmit the link to the mobile telecommunications device. The RVS 102 can transmit the link, intent or code using a text message, notification, electronic message, electronic mail, or a short message service protocol.

The link, in some cases, can be referred to as an intent to be provided in or via an activity. For example, a link can be an instance of an intent, and a browser can be an instance of an activity. Thus, the RVS 102 can use one or more techniques to provide an identifier or a session with which to connect or add a device. An end user can interact with the mobile telecommunications device to activate an intent. An intent can provide a facility for performing late runtime binding between the code in different applications. An intent can be used to launch an activity or launch an application. An intent can include an action and data, and the action can indicate how the mobile telecommunications device operates on the data. An intent can be expressed as a uniform resource identifier (URI), for example, content://data. An intent can be a link, for example, with the action represented by "http" and the data represented by the body of a uniform resource locator (URL). For example, an intent such as http://www_example_com can indicate an intent to open a web connection on port 80 to the server represented by www_example_gov and use the HTTP protocol, initiate a GET operation on the endpoint/index.html and render the result for display.

The local computing device 122 can display an indication of the link via a display device of the local computing device 122. For example, the interface 128 can include a display device, such as a screen. The local computing device 122 can further include an input interface, such as a touch interface, keypad, mouse, pointer, gesture interface, voice interface or other input interface. For example, a user of the local computing device 122 can select the link by clicking on the link, pointing to the link, pushing a button, or otherwise selecting or providing an indication to activate the link.

The local computing device 122, responsive to selection of the link, can launch a web browser to request content. The web browser can access the link or content provided at or by the link. Responsive to selection of the link, the local computing device 122 (e.g., mobile telecommunications device) can call an application programming interface that provides a prompt for display on the mobile telecommunications device. The prompt can request authorization to access the sensor 124 or camera 126 of the mobile telecommunications device.

The RVS 102 can receive, responsive to the selection of the link, the request for content from the local computing device 122. The code for the session can be embedded in the link. The request can indicate the code embedded in the link. For example, the link can be www_example_com/123456, where the number 123456 identifies the session and is also associated with the remote computing device 120 added to the session. Thus, by using the intent or link with the code, the RVS 102 can establish the real-time communication session without having to install any new application on the local computing device 122. By not having to install any additional applications, the present technical solution can provide an improvement to technology by reducing memory usage or storage on the local computing device 122 by not installing a new application and using a built-in application of the mobile operating system. Further, the present technical solution can also reduce network bandwidth consumption by not having to transfer an application to download on the local computing device 122. Further, the present technical solution can also reduce processor utilization by not having the local computing device install a new application.

The RVS 102 can obtain, responsive to the selection, access to data detected or collected by a sensor (e.g., sensor 124 or camera 126) of the local computing device 122. The RVS 102 can receive a data feed, frames, images, raw data, compressed data, multimedia content or other data collected or detected by one or more sensors of the local computing device 122.

The RVS 102 can identify, via a lookup in the database (e.g., in map data structure 118) using the code, the real-time communication session corresponding to the code. The RVS 102 can establish, via a web socket over a network protocol, the real-time communication session with a data feed from the sensor. For example, the video component 106 or a session controller component can add the local computing device 122 and the remote computing device 120 to the session corresponding to the code. The RVS 102 can provide the data feed for display on the remote computing device 120 (e.g., via an interface 128). The remote view system 102 can add the remote support technician device to the real-time communication session via the web socket over the network protocol.

The remote computing device 120, or RVS 102, can provide a command or instructions to display on the local computing device 122. The command can be an indicator, such as, for example, guide icons, audio alerts, visual indicators, vibrations, haptic feedback, or other indications.

The command can be rendered on the local computing device 122 as an indicator. The instructions can be provided to cause the local computing device 122 to pan, zoom, move or direct a sensor or camera at a certain location. For example, based on the data feed provided to the remote computing device 120, the user of the remote computing device 120 may signal to move the camera of the local computing device 122 to one direction or another, or to zoom in on an object. The RVS 102, upon receiving the indication from the remote computing device 120, can convert the indication into a command or instructions (e.g., an instruction stored in instruction data structure 116), and provide the command to control the local computing device 122 (e.g., or mobile telecommunications device). The command can include a visual icon, such as an arrow. The remote view system 102 can provide the command including an icon indicating a direction to move the mobile telecommunications device or to zoom in on an object. Zooming in on an object can include activating a digital or optical zoom of the camera 126, or physically moving or positioning the camera closer to the object.

To improve throughput of the data feed or smoothness of the rendering of the video, the RVS 102 can select a server of the RVS 102 manage the real-time communication session. The server can refer to a physical server or an instance of a virtual server executing or running on the RVS 102. The RVS 102 can relay the data feed between the sensor of the mobile telecommunications device and the remote support technician device via the selected server. For example, rather than receive the data feed from the camera by a first server, and then transmit the data feed to a different server that hosts the session and then provides the data feed to the remote computing device 120, the RVS 102 can select the same server or virtual server to both receive the data feed and transmit the data feed for rending on the remote computing device 120, thereby reducing network bandwidth usage, memory utilization, and processor utilization, while reducing latency, delay or lag between frames of the data feed.

In some cases, to provide reduction in network bandwidth usage, memory utilization, and processor utilization, the RVS 102 can establish a peer-to-peer communication channel such that the data feed of the real-time communication session is provided directly to the paired remote computing device 120 without being transmitted to the RVS 102. For example, the RVS 102 can initially establish the session responsive to selection of the link. Thereafter, the RVS 102 can provide the local computing device 122 and remote computing device 120 with identifiers of one another (e.g., IP addresses) to allow the local computing device 122 to transmit the data feed between the local computing device 122 and the remote computing device 120 (or remote support technician device) absent a relay between a server of the remote view system 102.

The RVS 102 can provide additional information along with the sensor data. The RVS 102 can use metadata associated with one or more sensors of the local computing device 122 (e.g., a mobile telecommunications device) to perform or provide additional functionality. The RVS 102 can use the metadata to improve frame rate, provide synchronization of frame rates, center images, pan, zoom, or provide other types of commands. However, it may be challenging to provide metadata via a data feed of a real-time communication channel or session. Further, without such metadata, the rendering of the images of the data feed may not be smooth or out of synch. Thus, systems and methods of the present technical solution can provide an encoding with metadata collected from one or more sensors of the local computing device 122.

The frames can be rendered with or without parsing, processing or otherwise using the metadata encoded in the pixels. For example, the metadata encoded in the pixels can be stripped off, removed, or filtered out prior to rendering the frames. The metadata can be used to perform operations on the frames. The metadata can be synchronized with each frame in that the metadata is associated with or indicative of a feature or characteristic of the specific frame.

For example, the RVS 102 can establish, responsive to a request to access a link via a web browser executed by a mobile telecommunications device, a real-time communication session between the mobile telecommunications device and a remote support technician device. The real-time communication session can provide a data feed comprising a plurality of data frames. The data frames can include images collected or captured by a camera 126 of the local computing device 122. The real-time communication session can be established via a web socket over a network protocol (e.g., an internet protocol, web RTC protocol).

The RVS 102 (e.g., via the video component 106) can receive, via the real-time communication session, the plurality of data frames. Each of the data frames can include a predetermined number, set or group of pixels that are encoded with metadata associated with one or more sensors 124 (or camera 126) of the mobile telecommunications device. The RVS 102 (e.g., via the video component 106), rather than forward the encoded pixels to the remote computing device 120 for display, can remove the predetermined plurality of pixels from each of the plurality of data frames prior to forwarding. The RVS 102 can then provide, based on the metadata encoded in the predetermined plurality of pixels, the plurality of data frames for rendering on the remote technician device. The plurality of data frames can be rendered without the predetermined plurality of pixels.

The metadata associated with the sensors 124 or camera 126 of the local computing device 122 can be obtained by a script executing within a browser executed by the local computing device 122. The script can request, for each frame of the plurality frames, and from the one or more sensors 124 or camera 126 of the local computing device 122, the metadata associated with the one or more sensors. The script can include or refer to a call to an application programming interface. The script can be a function, code, program, or executable. The script or API can be built into the web browser executing on the local computing device 122. The web browser can call the API, or receive a stream or metadata feed from the one or more sensors. The sensors 124 can include any type of sensor or detector including, for example, an accelerometer, a location sensor, GPS sensor, camera depth sensor, ambient light sensor, photodetector, proximity sensor, motion sensor, ambient sound sensor, microphone, gyroscope (e.g., three-axis gyroscope), object depth sensor, infrared sensor, laser, dot projector, magnetometer, compass, or barometer. The metadata can include information collected from one or more of the sensors, such as position information from the location sensor, depth information from the depth sensor, ambient light level information, ambient sound level information, motion information, proximity information, or motion or rotational information from the gyroscope.

In some cases, the sensors or a component can further perform image processing or object detection. For example, the local computing device 122 can include an image processor component configured to identify, detect or otherwise determine an object, such as a desk, chair, computing device, lamp, window, wall, floor, monitor, or other physical device. In some cases, the RVS 102 (e.g., via the video component 106) can perform the image processing to detect the objects. The RVS 102 can be configured to perform object detection using computer vision technologies, machine learning, deep learning approaches, classifiers. For example, machine learning approach can include a scale invariant feature transform, histogram of oriented gradients features, or Viola-Jones object detection framework based on Haar features. Deep learning approaches to object detection can include, for example, neural network, convolution neural networks, region proposals, or single shot multibox detectors.

A real-time communication channel may not initially be configured to provide sensor metadata for each frame. Thus, systems and methods of the present technical solution can include encoding the metadata information into a predetermined set of pixels of each frame. The RVS 102 can have a predetermined encoding technique for encoding the meta data into the predetermined pixels. The predetermined pixels can be selected such that they are not inadvertently removed or filtered out prior to being received and processed by the RVS 102. For example, the number, quantity, or location of pixels can be selected such that an image compression technique does not remove, filter, modify, or otherwise change the metadata information encoded and conveyed by the pixels. For example, the pixels can be selected such that a lossy or lossless image compression technique does not remove the encoded pixels, but preserves the raw data of the image. For example, in a lossy image compression technique (e.g., transform encoding or chroma subsampling), image colors may be averaged out using a formula. To avoid or prevent this from impacting the encoded data, the encoding can use a sufficient number of pixels such that the average pixel value maintains the metadata information.

The predetermined set of pixels can refer to pixels having a certain location in the frame, such as a top one or more rows of pixels, bottom one or more rows of pixels, a first column of pixels, or pixels having certain addresses. For example, the first 3 (or more or less) rows of pixels of each frame can be used to encode the metadata. The metadata can be encoded in the pixel using individual pixel color values. For example, the RVS 102 can include a key or map that relates a pixel color value to metadata information associated with a sensor. The map can indicate for a specific pixel what the color value translates to. For example, the first three pixels on the top row of the frame can indicate an x, y, and z coordinate associated with a three-axis gyroscope; the fourth pixel can indicate a velocity of the local computing device 122; the fifth pixel can indicate a direction of movement; the sixth pixel can indicate an ambient light level; the seventh and eight pixels can indicate a latitude and longitude value detected from a GPS sensor. The metadata encoded in the predetermined plurality of pixels can be different for each of the plurality of frames depending on how the sensor values change.

The script executing in the web browser, for example, can call one or more APIs or access sensor data and then encode the sensor data using the predetermined encoding technique. The RVS 102 can receive each frame of the plurality of frames each encoded with the metadata based on the predetermined encoding technique. The RVS 102 can use the metadata to perform various functions or render the frames. For example, the RVS 102 can use the gyroscope or location information encoded in each frame to stabilize the frame or images of the frames that are provided for rendering on the remote technician device (e.g., remote computing device 120). For example, the RVS 102, or remote computing device 120, can obtain the location information and determine how to center the frame or image such that objects in the frame or image appear to be stable, as opposed to providing a jittery frame where objects that are stable appear to be moving or appear jittery due to movement of the camera 126. The RVS 102 can determine from gyroscope metadata for each frame how to center the frame. For example, a corner of a desk can be located at pixel 200×200 on a first frame. The gyroscope can indicate that for the second frame, there was an inadvertent jitter, motion, or movement for the camera that causes a pixel offset of 5 in an x-axis for the second frame. For example, this pixel offset of 5 in the x-axis can result in the same corner of the desk being located at pixel 205×200 in the second frame that is subsequent to the first frame. Using the gyroscope metadata encoded in the predetermined pixels of the second frame, the RVS 102 can determine to offset the second frame by 5 pixels in the opposite direction in the x-axis in order to cancel out or remote the inadvertent jitter or motion, thereby displaying the same corner of the desk at the same location in the frame at 200×200, thereby providing image stabilization.

The RVS 102 can use the sensor metadata to create a three-dimensional environment or display. For example, the sensor metadata can include depth information associated with the camera or objects detected by the camera. The depth information can indicate a distance or depth between the camera and objects in the image. The depth information can indicate a depth range, such as the depth range between the closest object and the furthest object in the frame (or the depth between the pixels containing the closest object and the pixels containing the furthest object). The RVS 102 can use depth information, gyroscope information, or position information to stitch together frames to create a three-dimensional display or environment to be rendered or presented on the remote computing device 120. The RVS 102 can stitch together the frames to create a two-dimensional image or a three-dimensional view.

The remote technician device 120 can provide an instruction or indication to move or guide the camera. The indication can be to move the camera closer to an object, such as a computer, server, hard drive, component, or other location or position. The indication can be to guide the camera to a location within a room or zoom in on an object or at a position. The RVS 102 can receive the indication from the remote technician device 120. The RVS 102 can generate, based on the metadata information from the one or more sensors and the position associated with one or more frames, an instruction to zoom or pan the camera. The RVS 102 can provide the instruction for display on a display device of the mobile telecommunications device 122. The instruction can be provided as an icon corresponding to the instruction to zoom or pan.

For example, the instruction can be to zoom if the remote technician indicates to go closer to an object in the frame. The instruction can be to pan if the remote technician indicates to go the left or right of the frame in order to view an object or location that is not currently in the frame or not fully in the current frame.

Figure 1B:
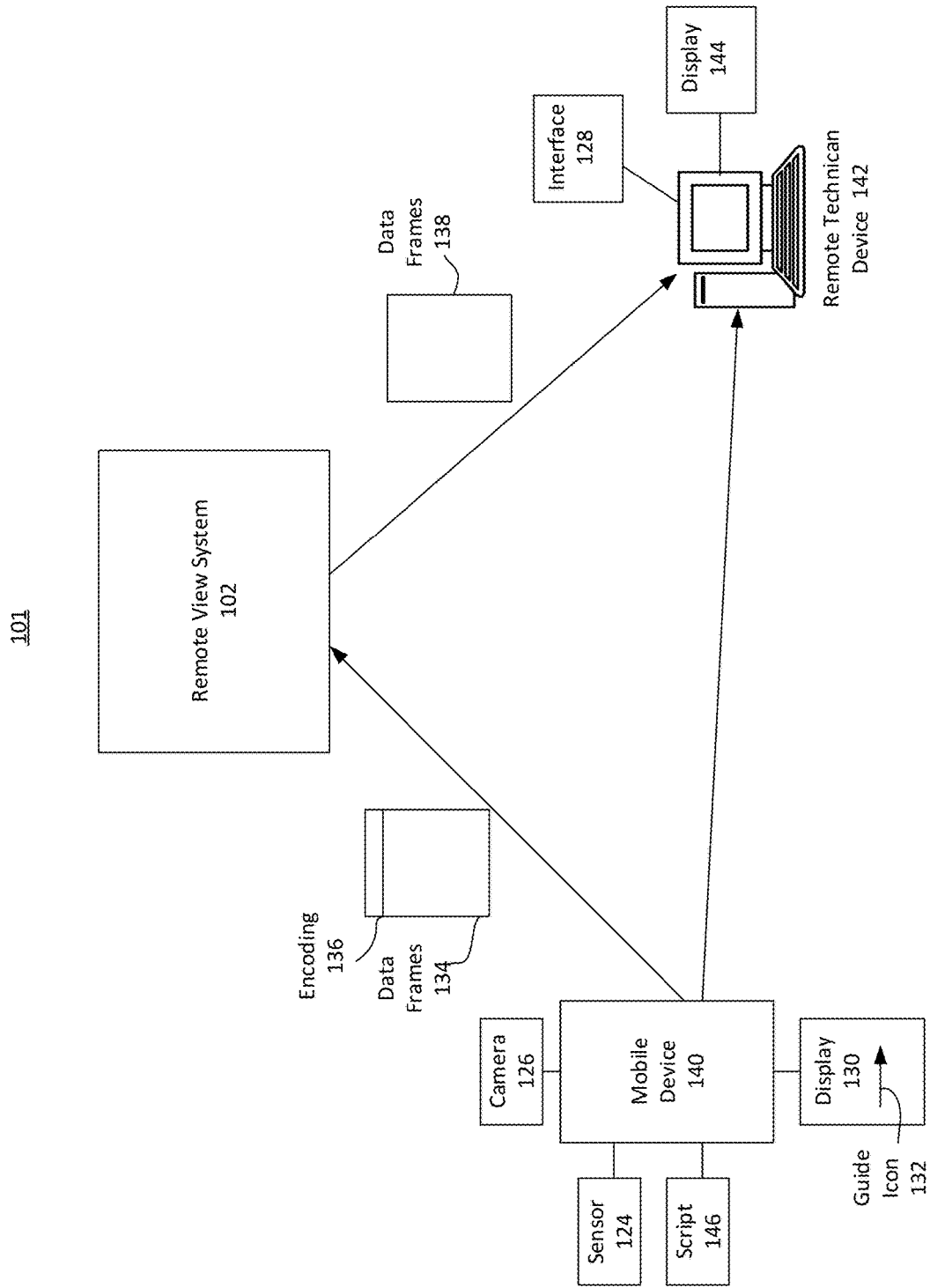
FIG. 1B is an illustrative block diagram of an example embodiment of a system for remote perspective or view and control of information technology infrastructure.

Referring now to FIG. 1B, an illustrative block diagram of an example embodiment of a system for remote perspective or view and control of information technology infrastructure is shown. The system 101 can include one or more component or functionality depicted in FIG. 1A, including, for example, a remote view system 102, sensor 124, or camera 126. The system 101 can include, interface with, or communicate with a mobile device 140 (e.g., a mobile telecommunications device) and a remote technician device 142. The mobile device 140 can include one or more component or functionality of local computing device 122. The remote technician device 142 can include one or more component or functionality of remote computing device 120.

The remote view system 102 can establish a real-time communication session between the mobile device 140 and the remote technician device 142. The mobile device 140 can capture images from the camera 126 and provide them to the RVS 102 or directly to the remote technician device 142 for presentation via display 144. For example, the images can be provided as data frames 134 to the RVS 102. The mobile device 140 (e.g., via a script 146 executing in a web browser or other component) can obtain metadata from sensor 124 or camera 126 and encode the data into pixels in the frames, such as via encoding 136 in data frame 134. The encoded pixels 136 and data frame 134 can be provided to the RVS 102. The RVS 102 can process the encoded pixels and then remove the encoded pixels and provide data frame 138 without the encoded pixels for presentation via display 144 of the remote technician device 142.

The remote technician device 142 can input instructions via interface 128 to guide the camera 126. The input can be provided to RVS 102, which can translate or convert the instructions into a guide icon 132 to presented via display 130. The guide icon 132 can include, for example, and arrow, sign, sound, audio instruction, flashing light, haptic feedback, or other indicator to move, guide, pan or zoom the camera 126 or mobile device 140. The guide can be generated on the RVS 102 (e.g., using the frame synced metadata), or instructions (e.g., position or direction information) can be provided to the mobile device 140 which can locally generate or render the guide based on the position or direction information.

Figure 2A:
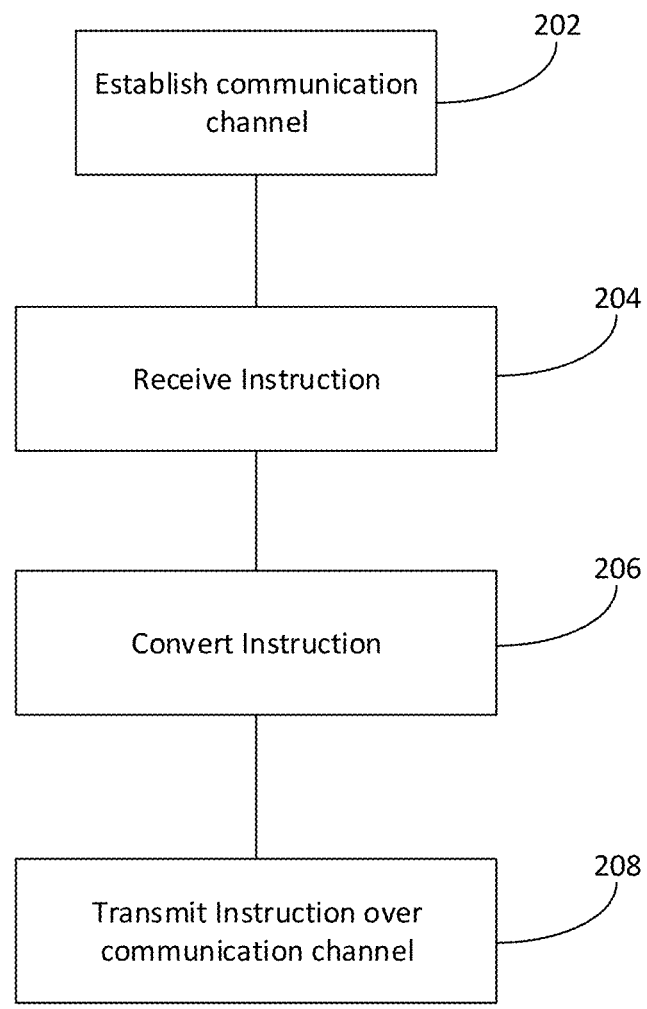
FIGS. 2A-2C is an illustrative block diagram of an example embodiment of a method for remote perspective and control of information technology infrastructure.

Referring to FIG. 2A, an illustrative block diagram of an example embodiment of a method 200 of providing remote control in information technology infrastructure is shown. The method 200 can be performed by one or more system or component depicted in FIGS. 1A-1B and 3A-3D. For example, method 200 can be performed by an RVS, remote computing device, and local computing device. In brief overview, the method 200 includes the RVS establishing a communication channel at 202. At 204, the RVS receives an instruction. At 206, the RVS converts the instruction. At 208, the RVS transmits the instruction over a communication channel.

Still referring to FIG. 2A, and in further detail, the method 200 includes the RVS establishing a communication channel at 202. The RVS can establish a communication channel between the local computing device 122 and a remote computing device 120. The communication channel can be via the RVS. The communication channel can establish or employ one or more protocols, such as networking protocols, streaming protocols, video protocols, or audio protocols. The communication channel can stream images or video obtained by a local computing device. The RVS can stream the images or videos from the local computing device to the remote computing device.

At 204, the RVS can receive an instruction. The RVS can receive an instruction from the remote computing device. The RVS can receive an instruction via a sensor of the remote computing device, an input device, or an interface of the remote computing device. The instruction can be an instruction to pan, zoom, or perform additional tasks.

At 206, the RVS can convert the instruction to a command to provide to the local computing device. The RVS can convert the instruction using a policy or conversion engine to generate the command to transmit to the local computing device. For example, the RVS can convert an instruction to zoom into a command that causes the camera to automatically zoom. The RVS can convert an instruction to pan to a command that displays a visual indication on the local computing device to pan in the desired direction. The RVS can convert an instruction to pan to a command that provides an auditory prompt.

At 208, the RVS can transmit the command over the communication channel. The RVS can use the same communication channel established between the RVS and the local computing device to receive the video stream. The RVS can use a different communication channel established between the RVS and the local computing device.

Figure 2B:
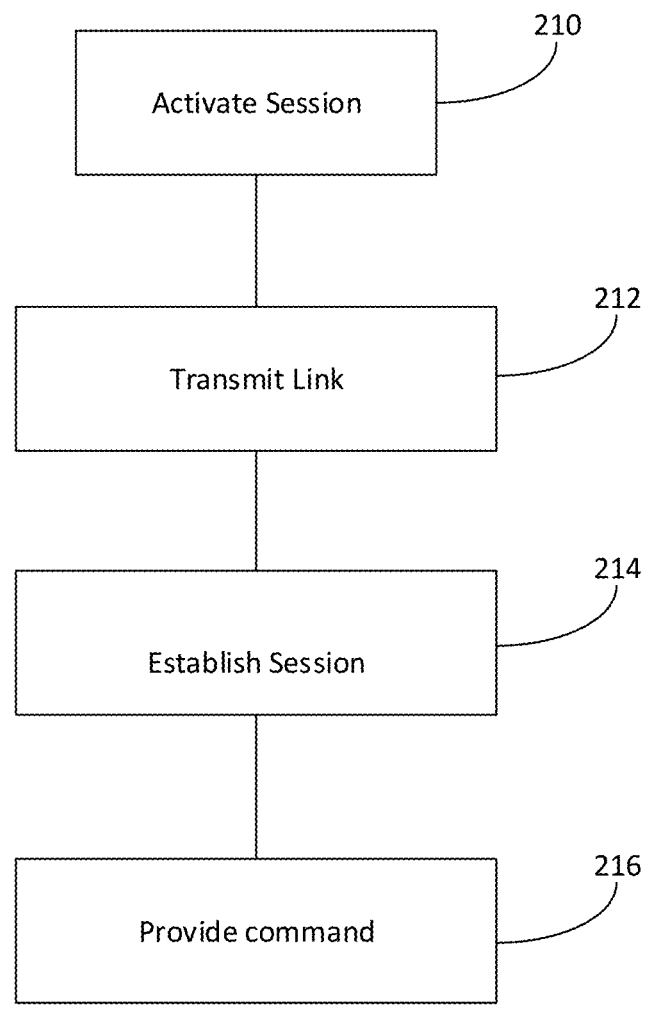

Referring to FIG. 2B, an illustrative block diagram of an example embodiment of a method 201 of providing remote control in information technology infrastructure is shown. The method 201 can be performed by one or more system or component depicted in FIGS. 1A-1B and 3A-3D. For example, method 201 can be performed by an RVS, remote computing device, and local computing device. In brief overview, the method 201 includes the RVS activating a session at 210. At 212, the RVS transmits a link. At 214, the RVS establishes a session. At 216, the RVS provides a command.

At 210, the RVS can activate a session at 210. The RVS can activate a real-time communication session and a code for the real-time communication session.

At 212, the RVS transmits a link. The RVS can generate the link comprising an indication of the code for the real-time communication session. The RVS can identify, via a lookup in a database using the code, an identifier of a mobile telecommunications device remote from the remote view system. The RVS can transmit, using the identifier, via a network, the link to the mobile telecommunications device. The mobile device can automatically respond to an SMS with the link without any user action, or a user of the mobile device can select the link. The mobile device may request authentication information or user credentials before launching the link.

At 214, the RVS establishes a session. For example, the RVS can receive, responsive to the selection of the link, the a for content from the mobile telecommunications device. The request can indicate the code embedded in the link. The RVS can obtain, responsive to the selection, access to data of a sensor of the mobile telecommunications device. The RVS can identify, via a lookup in the database using the code, the real-time communication session corresponding to the code. The RVS can establish, via a web socket over a network protocol, the real-time communication session with a data feed from the sensor.

At 216, the RVS provides a command. The command can be based on at least a portion of the data feed. The command can be control the mobile telecommunications device.

Figure 2C:
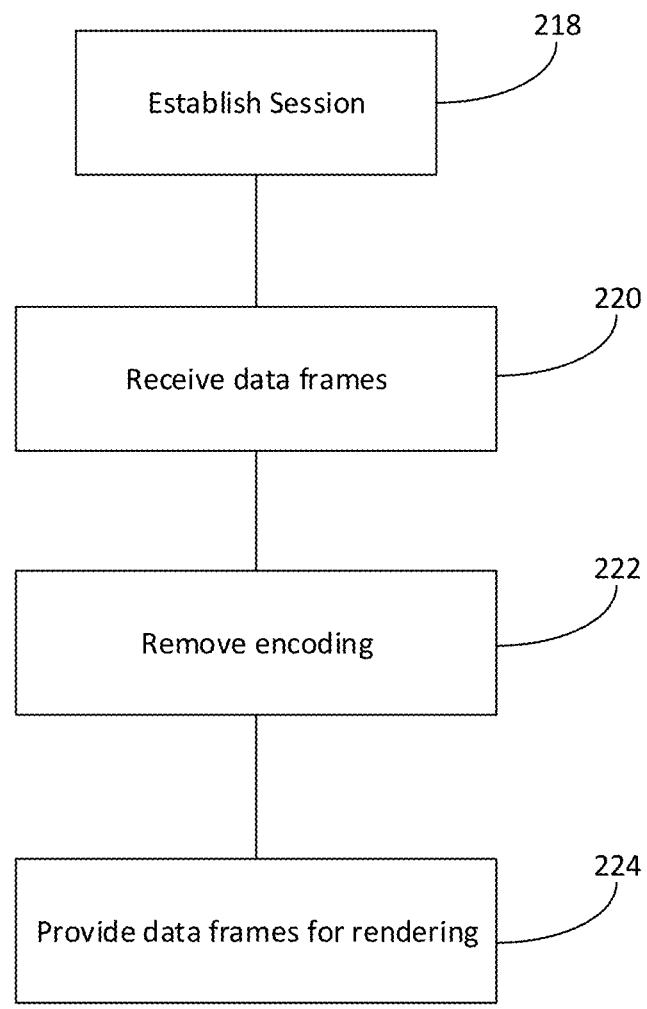

Referring to FIG. 2C, an illustrative block diagram of an example embodiment of a method 203 of providing remote control in information technology infrastructure is shown. The method 203 can be performed by one or more system or component depicted in FIGS. 1A-1B and 3A-3D. For example, method 203 can be performed by an RVS, remote computing device, and local computing device. In brief overview, the method 203 includes the RVS establishing a session at 218. At 220, the RVS receives data frames. At 222, the RVS removes encoding from the data frames. At 224, the RVS provides data frames for rendering.

At 218, the RVS establishes a session at 218. The RVS establishes, responsive to a request to access a link via a web browser executed by a mobile telecommunications device, via a web socket over a network protocol, a real-time communication session between the mobile telecommunications device and a remote support technician device. The real-time communication session can include a plurality of data frames comprising data detected by a sensor of the mobile telecommunications device.

At 220, the RVS receives data frames. The RVS can receive, via the real-time communication session, the plurality of data frames. Each of the plurality of data frames can include a predetermined plurality of pixels encoded with metadata associated with one or more sensors of the mobile telecommunications device.

At 222, the RVS removes encoding from the data frames. The remote view system can remove the predetermined plurality of pixels from each of the plurality of data frames. At 224, the RVS provides data frames for rendering. The remote view system can provide, to the remote technician device, the plurality of data frames for rendering based on the metadata encoded in the predetermined plurality of pixels. The plurality of data frames can be rendered without the predetermined plurality of pixels.

Figure 3A:
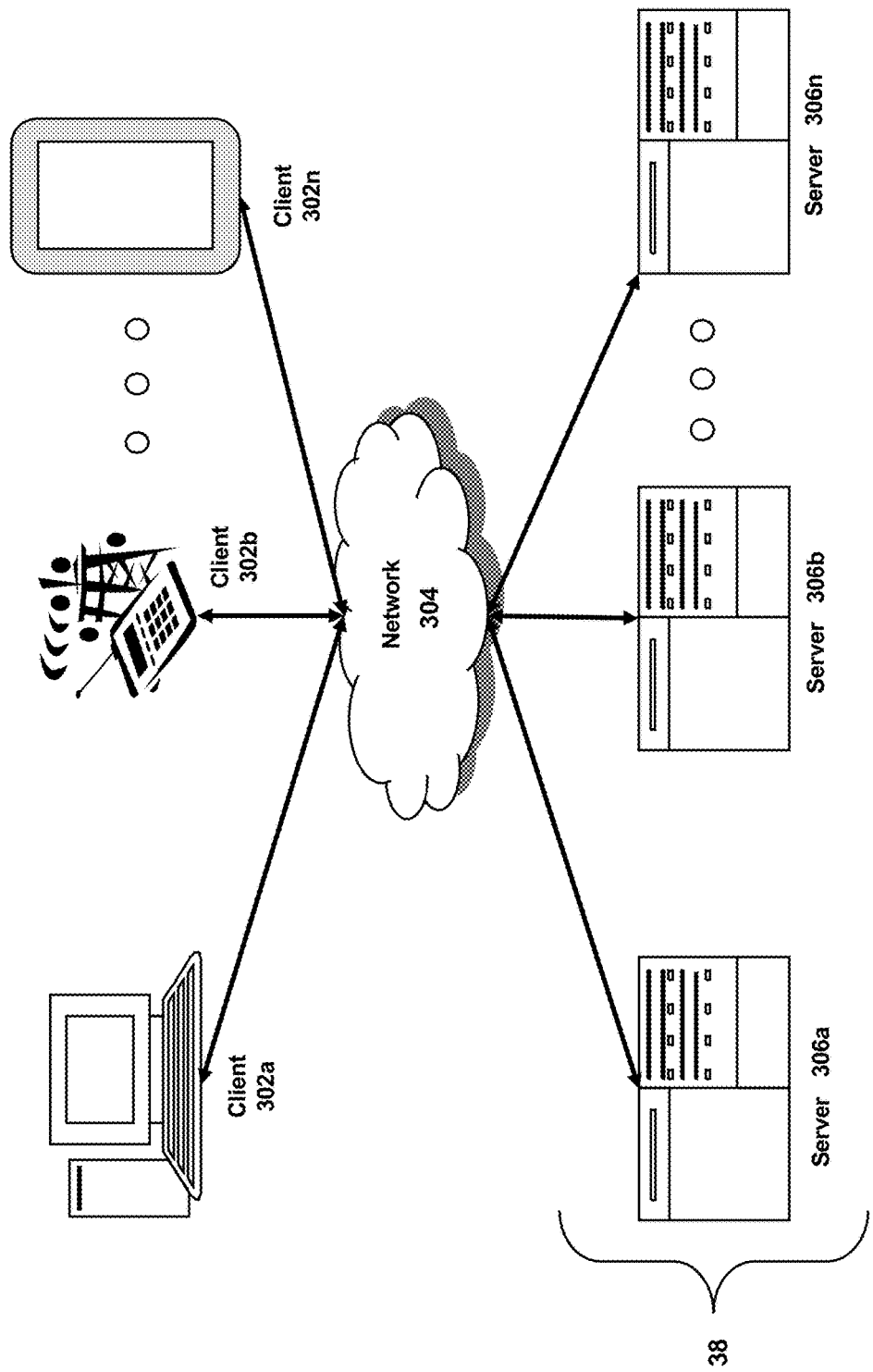
FIG. 3A is a block diagram depicting an embodiment of a network environment comprising client device in communication with server device.

Referring to FIG. 3A, an embodiment of a network environment that can be used in connection with the methods and systems described herein is depicted. In brief overview, the network environment includes one or more clients 302a-302n (also generally referred to as local machine(s) 302, client(s) 302, client node(s) 302, client machine(s) 302, client computer(s) 302, client device(s) 302, endpoint(s) 302, or endpoint node(s) 302) in communication with one or more servers 306a-306n (also generally referred to as server(s) 306, node 306, or remote machine(s) 306) via one or more networks 304. In some embodiments, a client 302 has the capacity to function as both a client node seeking access to resources provided by a server and as a server providing access to hosted resources for other clients 302a-302n.

Although FIG. 3A shows a network 304 between the clients 302 and the servers 306, the clients 302 and the servers 306 may be on the same network 304. In some embodiments, there are multiple networks 304 between the clients 302 and the servers 306. In one of these embodiments, a network 304' (not shown) may be a private network and a network 304 may be a public network. In another of these embodiments, a network 304 may be a private network and a network 304' a public network. In still another of these embodiments, networks 304 and 304' may both be private networks.

The network 304 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 304 may be any type and/or form of network. The geographical scope of the network 304 may vary widely and the network 304 can be a body area network (BAN), a personal area network (PAN), a local-area network (LAN), e.g. Intranet, a metropolitan area network (MAN), a wide area network (WAN), or the Internet. The topology of the network 304 may be of any form and may include, e.g., any of the following: point-to-point, bus, star, ring, mesh, or tree. The network 304 may be an overlay network which is virtual and sits on top of one or more layers of other networks 304'. The network 304 may be of any such network topology as known to those ordinarily skilled in the art capable of supporting the operations described herein. The network 304 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 304 may be a type of a broadcast network, a telecommunications network, a data communication network, or a computer network.

In some embodiments, the system may include multiple, logically-grouped servers 306. In one of these embodiments, the logical group of servers may be referred to as a server farm 38 or a machine farm 38. In another of these embodiments, the servers 306 may be geographically dispersed. In other embodiments, a machine farm 38 may be administered as a single entity. In still other embodiments, the machine farm 38 includes a plurality of machine farms 38. The servers 306 within each machine farm 38 can be heterogeneous—one or more of the servers 306 or machines 306 can operate according to one type of operating system platform (e.g., WINDOWS NT, manufactured by Microsoft Corp. of Redmond, Wash.), while one or more of the other servers 306 can operate on according to another type of operating system platform (e.g., Unix, Linux, or Mac OS X).

In one embodiment, servers 306 in the machine farm 38 may be stored in high-density rack systems, along with associated storage systems, and located in an enterprise data center. In this embodiment, consolidating the servers 306 in this way may improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 38 do not need to be physically proximate to another server 306 in the same machine farm 38. Thus, the group of servers 306 logically grouped as a machine farm 38 may be interconnected using a wide-area network (WAN) connection or a metropolitan-area network (MAN) connection. For example, a machine farm 38 may include servers 306 physically located in different continents or different regions of a continent, country, state, city, campus, or room. Data transmission speeds between servers 306 in the machine farm 38 can be increased if the servers 306 are connected using a local-area network (LAN) connection or some form of direct connection. Additionally, a heterogeneous machine farm 38 may include one or more servers 306 operating according to a type of operating system, while one or more other servers 306 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 306 may comprise components, subsystems and modules to support one or more management services for the machine farm 38. In one of these embodiments, one or more servers 306 provide functionality for management of dynamic data, including techniques for handling failover, data replication, and increasing the robustness of the machine farm 38. Each server 306 may communicate with a persistent store and, in some embodiments, with a dynamic store.

Server 306 may be a file server, application server, web server, proxy server, appliance, network appliance, gateway, gateway server, virtualization server, deployment server, SSL VPN server, or firewall. In one embodiment, the server 306 may be referred to as a remote machine or a node. In another embodiment, a plurality of nodes 290 may be in the path between any two communicating servers.

Figure 3B:
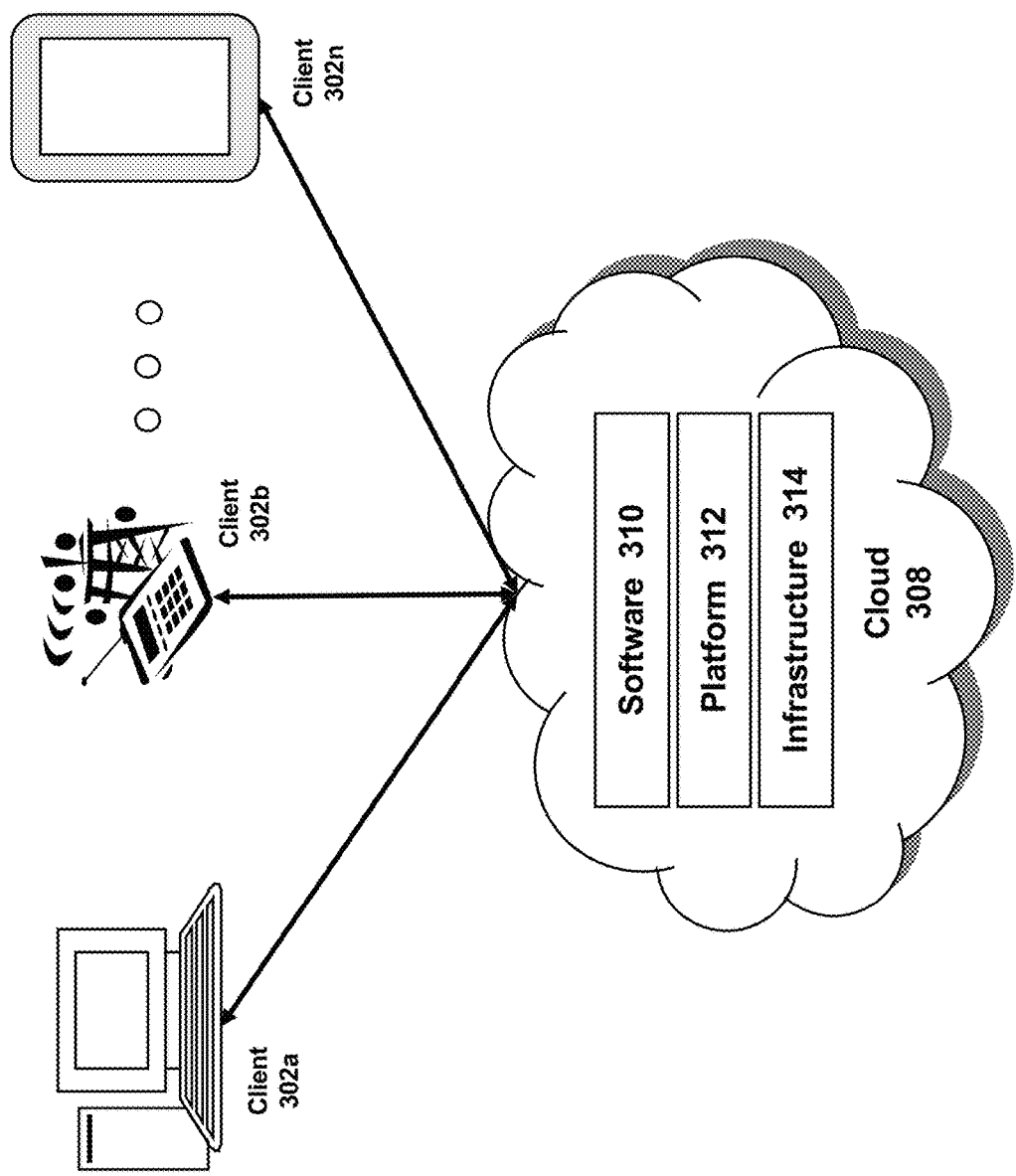
FIG. 3B is a block diagram depicting a cloud computing environment comprising client device in communication with cloud service providers.

Referring to FIG. 3B, a cloud computing environment is depicted. A cloud computing environment may provide client 302 with one or more resources provided by a network environment. The cloud computing environment may include one or more clients 302a-302n, in communication with the cloud 308 over one or more networks 304. Clients 302 may include, e.g., thick clients, thin clients, and zero clients. A thick client may provide at least some functionality even when disconnected from the cloud 308 or servers 306. A thin client or a zero client may depend on the connection to the cloud 308 or server 306 to provide functionality. A zero client may depend on the cloud 308 or other networks 304 or servers 306 to retrieve operating system data for the client device. The cloud 308 may include back end platforms, e.g., servers 306, storage, server farms or data centers.

The cloud 308 may be public, private, or hybrid. Public clouds may include public servers 306 that are maintained by third parties to the clients 302 or the owners of the clients. The servers 306 may be located off-site in remote geographical locations as disclosed above or otherwise. Public clouds may be connected to the servers 306 over a public network. Private clouds may include private servers 306 that are physically maintained by clients 302 or owners of clients. Private clouds may be connected to the servers 306 over a private network 304. Hybrid clouds 308 may include both the private and public networks 304 and servers 306.

The cloud 308 may also include a cloud based delivery, e.g. Software as a Service (SaaS) 310, Platform as a Service (PaaS) 314, and Infrastructure as a Service (IaaS) 614. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 302 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 302 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 302 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 302 may also access SaaS resources through smartphone or tablet applications, including, e.g., Salesforce Sales Cloud, or Google Drive app. Clients 302 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 3C:
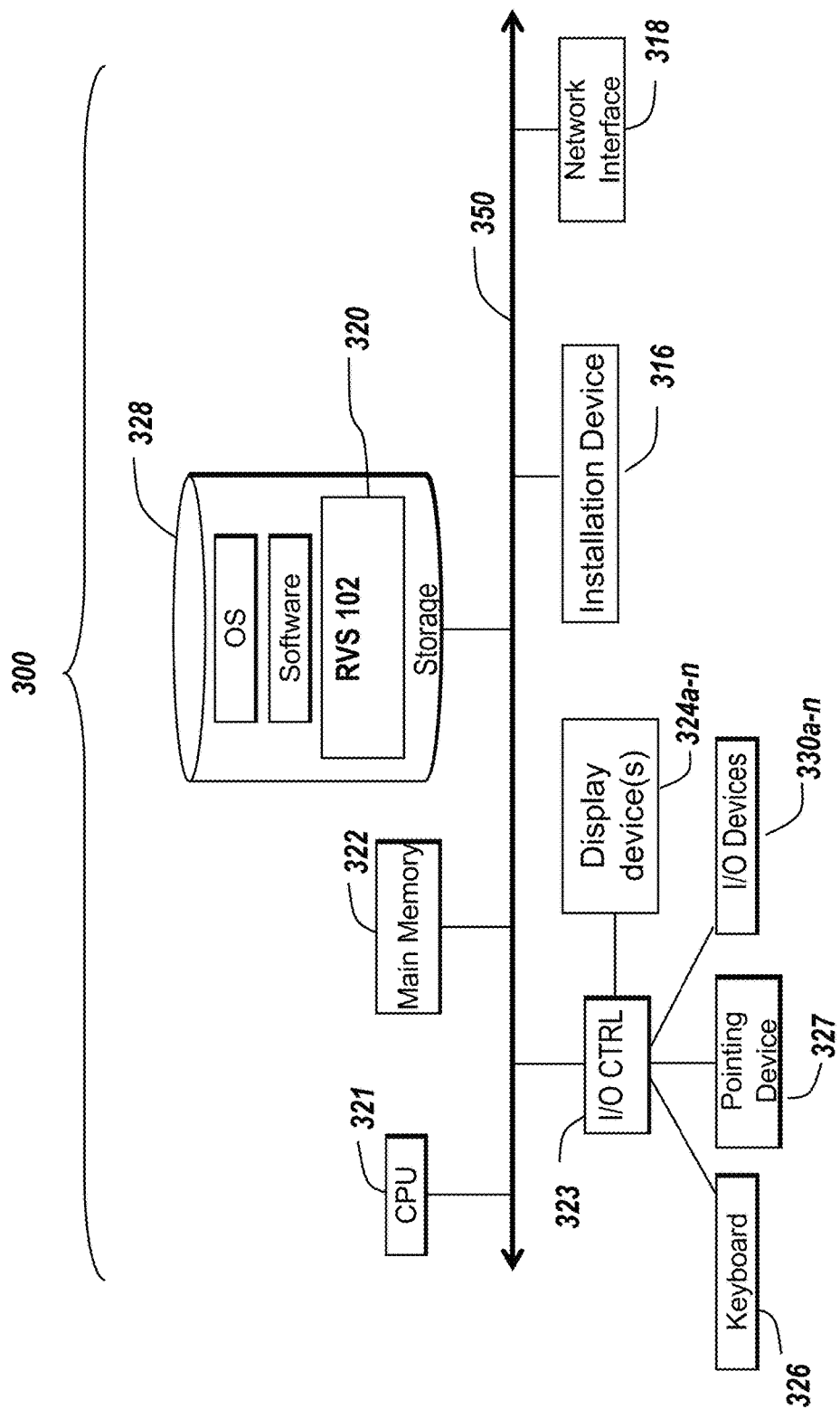
FIGS. 3C and 3D are block diagrams depicting embodiments of computing devices useful in connection with the methods and systems described herein.
Figure 3D:
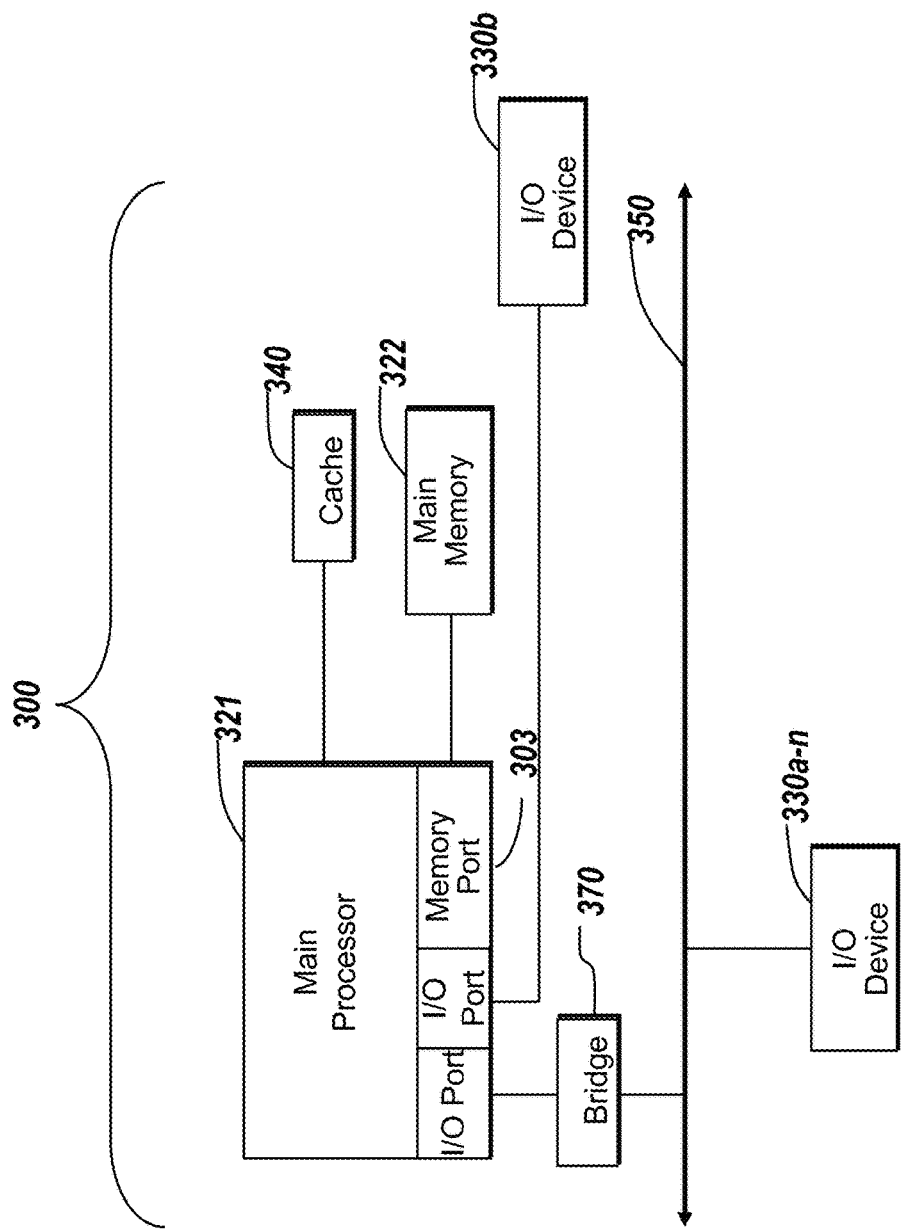

The client 302 and server 306 may be deployed as and/or executed on any type and form of computing device, e.g. a computer, network device or appliance capable of communicating on any type and form of network and performing the operations described herein. FIGS. 6C and 6D depict block diagrams of a computing device 300 useful for practicing an embodiment of the client 302 or a server 306. As shown in FIGS. 6C and 6D, each computing device 300 includes a central processing unit 321, and a main memory unit 322. As shown in FIG. 3C, a computing device 300 may include a storage device 328, an installation device 316, a network interface 318, an I/O controller 323, display devices 324a-324n, a keyboard 326 and a pointing device 327, e.g. a mouse. The storage device 328 may include, without limitation, an operating system, software, and a software of or associated with SCS 100. As shown in FIG. 3D, each computing device 300 may also include additional optional elements, e.g. a memory port 303, a bridge 370, one or more input/output devices 330a-330n (generally referred to using reference numeral 330), and a cache memory 640 in communication with the central processing unit 321.

The central processing unit 321 is any logic circuitry that responds to and processes instructions fetched from the main memory unit 322. In many embodiments, the central processing unit 321 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 300 may be based on any of these processors, or any other processor capable of operating as described herein. The central processing unit 321 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 322 may include one or more memory chips capable of storing data and allowing any storage location to be directly accessed by the microprocessor 321. Main memory unit 322 may be volatile and faster than storage 328 memory. Main memory units 322 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 322 or the storage 328 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 322 may be based on any of the above described memory chips, or any other available memory chips capable of operating as described herein. In the embodiment shown in FIG. 3C, the processor 321 communicates with main memory 322 via a system bus 350 (described in more detail below). FIG. 3D depicts an embodiment of a computing device 300 in which the processor communicates directly with main memory 322 via a memory port 303. For example, in FIG. 3D the main memory 322 may be DRDRAM.

FIG. 3D depicts an embodiment in which the main processor 321 communicates directly with cache memory 640 via a secondary bus, sometimes referred to as a backside bus. In other embodiments, the main processor 321 communicates with cache memory 640 using the system bus 350. Cache memory 640 typically has a faster response time than main memory 322 and is typically provided by SRAM, BSRAM, or EDRAM. In the embodiment shown in FIG. 3D, the processor 321 communicates with various I/O devices 330 via a local system bus 350. Various buses may be used to connect the central processing unit 321 to any of the I/O devices 330, including a PCI bus, a PCI-X bus, or a PCI-Express bus, or a NuBus. For embodiments in which the I/O device is a video display 324, the processor 321 may use an Advanced Graphics Port (AGP) to communicate with the display 324 or the I/O controller 323 for the display 324. FIG. 3D depicts an embodiment of a computer 300 in which the main processor 321 communicates directly with I/O device 330b or other processors 321' via HYPERTRANSPORT, RAPIDIO, or INFINIBAND communications technology. FIG. 3D also depicts an embodiment in which local busses and direct communication are mixed: the processor 321 communicates with I/O device 330a using a local interconnect bus while communicating with I/O device 330b directly.

A wide variety of I/O devices 330a-330n may be present in the computing device 300. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 330a-330n may include a combination of multiple input or output devices, including, e.g., Microsoft KINECT, Nintendo Wiimote for the WII, Nintendo WII U GAMEPAD, or Apple IPHONE. Some devices 330a-330n allow gesture recognition inputs through combining some of the inputs and outputs. Some devices 330a-330n provides for facial recognition which may be utilized as an input for different purposes including authentication and other commands. Some devices 330a-330n provides for voice recognition and inputs, including, e.g., Microsoft KINECT, SIRI for IPHONE by Apple, Google Now or Google Voice Search.

Additional devices 330a-330n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 330a-330n, display devices 324a-324n or group of devices may be augment reality devices. The I/O devices may be controlled by an I/O controller 323 as shown in FIG. 3C. The I/O controller may control one or more I/O devices, such as, e.g., a keyboard 326 and a pointing device 327, e.g., a mouse or optical pen. Furthermore, an I/O device may also provide storage and/or an installation medium 316 for the computing device 300. In still other embodiments, the computing device 300 may provide USB connections (not shown) to receive handheld USB storage devices. In further embodiments, an I/O device 330 may be a bridge between the system bus 350 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 324a-324n may be connected to I/O controller 323. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 324a-324n may also be a head-mounted display (HMD). In some embodiments, display devices 324a-324n or the corresponding I/O controllers 323 may be controlled through or have hardware support for OPENGL or DIRECTX API or other graphics libraries.

In some embodiments, the computing device 300 may include or connect to multiple display devices 324a-324n, which each may be of the same or different type and/or form. As such, any of the I/O devices 330a-330n and/or the I/O controller 323 may include any type and/or form of suitable hardware, software, or combination of hardware and software to support, enable or provide for the connection and use of multiple display devices 324a-324n by the computing device 300. For example, the computing device 300 may include any type and/or form of video adapter, video card, driver, and/or library to interface, communicate, connect or otherwise use the display devices 324a-324n. In one embodiment, a video adapter may include multiple connectors to interface to multiple display devices 324a-324n. In other embodiments, the computing device 300 may include multiple video adapters, with each video adapter connected to one or more of the display devices 324a-324n. In some embodiments, any portion of the operating system of the computing device 300 may be configured for using multiple displays 324a-324n. In other embodiments, one or more of the display devices 324a-324n may be provided by one or more other computing devices 300a or 300b connected to the computing device 300, via the network 304. In some embodiments software may be designed and constructed to use another computer's display device as a second display device 324a for the computing device 300. For example, in one embodiment, an Apple iPad may connect to a computing device 300 and use the display of the device 300 as an additional display screen that may be used as an extended desktop. One ordinarily skilled in the art will recognize and appreciate the various ways and embodiments that a computing device 300 may be configured to have multiple display devices 324a-324n.

Referring again to FIG. 3C, the computing device 300 may comprise a storage device 328 (e.g. one or more hard disk drives or redundant arrays of independent disks) for storing an operating system or other related software, and for storing application software programs such as any program related to the software 320 for the experiment tracker system. Examples of storage device 328 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 328 may be non-volatile, mutable, or read-only. Some storage device 328 may be internal and connect to the computing device 300 via a bus 350. Some storage device 328 may be external and connect to the computing device 300 via a I/O device 330 that provides an external bus. Some storage device 328 may connect to the computing device 300 via the network interface 318 over a network 304, including, e.g., the Remote Disk for MACBOOK AIR by Apple. Some client devices 300 may not require a non-volatile storage device 328 and may be thin clients or zero clients 302. Some storage device 328 may also be used as a installation device 316, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 300 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 302. An application distribution platform may include a repository of applications on a server 306 or a cloud 308, which the clients 302a-302n may access over a network 304. An application distribution platform may include application developed and provided by various developers. A user of a client device 302 may select, purchase and/or download an application via the application distribution platform.

Furthermore, the computing device 300 may include a network interface 318 to interface to the network 304 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 300 communicates with other computing devices 300' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 318 may comprise a built-in network adapter, network interface card, PCMCIA network card, EXPRESSCARD network card, card bus network adapter, wireless network adapter, USB network adapter, modem or any other device suitable for interfacing the computing device 300 to any type of network capable of communication and performing the operations described herein.

A computing device 300 of the sort depicted in FIGS. 6B and 6C may operate under the control of an operating system, which controls scheduling of tasks and access to system resources. The computing device 300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 300 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 300 has sufficient processor power and memory capacity to perform the operations described herein. In some embodiments, the computing device 300 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 300 is a gaming system. For example, the computer system 300 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 300 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 300 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 300 is a tablet e.g. the IPAD line of devices by Apple; GALAXY TAB family of devices by Samsung; or KINDLE FIRE, by Amazon.com, Inc. of Seattle, Wash. In other embodiments, the computing device 300 is a eBook reader, e.g. the KINDLE family of devices by Amazon.com, or NOOK family of devices by Barnes & Noble, Inc. of New York City, N.Y.

In some embodiments, the communications device 302 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 302 is a laptop or desktop computer equipped with a web browser and a microphone and speaker system, e.g. a telephony headset. In these embodiments, the communications devices 302 are web-enabled and can receive and initiate phone calls. In some embodiments, a laptop or desktop computer is also equipped with a webcam or other video capture device that enables video chat and video call.

In some embodiments, the status of one or more machines 302, 306 in the network 304 can be monitored as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. The computer-readable programs can be implemented in a programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures may be performed in any order. In certain embodiments, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system to manage information technology infrastructure, comprising:
    a session controller retrieving computer-readable instructions from a memory element and executing on one or more processors to:
        activate a real-time communication session;
        generate a link including an indication of a code for the real-time communication session;
        identify, via a lookup in a database using the code, an identifier of a mobile telecommunications device;
        transmit via a network, using the identifier, the link to the mobile telecommunications device;
        receive, from the mobile telecommunications device, a request for content indicating the code included in the link;
        obtain access to data from a camera of the mobile telecommunications device;
        identify, via a lookup in the database using the code, the real-time communication session corresponding to the code;
        establish, via a web socket, the real-time communication session with a data feed from the camera comprising one or more images or video; and
        provide, based on a portion of the data feed, a command with a visual or auditory indication to control the mobile telecommunications device.

2. The system of claim 1, further comprising:
    the session controller transmitting the link via a short message service protocol.

3. The system of claim 1, further comprising:
    the session controller providing the command comprising an icon indicating a direction to move the mobile telecommunications device.

4. The system of claim 1, further comprising:
    the session controller providing provide the command comprising an icon indicating to zoom in on an object.

5. The system of claim 1, further comprising the session controller executing computer-readable instructions to:
    identify a remote support technician device;
    generate the code to pair the mobile telecommunications device with the remote support technician device; and
    store, in an index, the code for the real-time communication session and an indication of the remote support technician device paired with the mobile telecommunications device.

6. The system of claim 1, further comprising generating a link including an indication of a numerical code for the real-time communication session.

7. The system of claim 1, further comprising the session controller executing computer-readable instructions to:
    select a server to manage the real-time communication session; and
    establish, via a web socket over a network protocol, the real-time communication session between the camera of the mobile telecommunications device and a remote support technician device via the selected server.

8. The system of claim 1, further comprising the session controller executing computer-readable instructions to:
    establish, via a web socket over a network protocol, the real-time communication session between the mobile telecommunications device and a remote support technician device.

9. The system of claim 1, further comprising the session controller executing computer-readable instructions to:
    add a remote support technician device to the real-time communication session via the web socket over the network protocol.

10. A method of managing information technology infrastructure, comprising:
    activating, by a session controller retrieving computer-readable instructions from a memory element and executing on one or more processors, a real-time communication session;
    generating, by the session controller, a link including an indication of a code for the real-time communication session;
    identifying, by the session controller, via a lookup in a database using the code, an identifier of a mobile telecommunications device;
    transmitting via a network, by the session controller using the identifier, the link to the mobile telecommunications device
    receiving, by the session controller, a request for content from the mobile telecommunications device, the request indicating the code included in the link;
    obtaining, by the remote view system responsive to the selection, access to data of a camera of the mobile telecommunications device;
    identifying, by the session controller via a lookup in the database using the code, the real-time communication session corresponding to the code;
    establishing, by the session controller via a web socket, the real-time communication session with a data feed from the camera comprising one or more images or video; and
    providing, by the session controller, based on a portion of the data feed, a command with a visual or auditory indication to control the mobile telecommunications device.

11. The method of claim 10, wherein transmitting further comprises:
    transmitting, by the session controller, the link via a short message service protocol.

12. The method of claim 10, wherein providing further comprises:
    providing, by the session controller, the command comprising an icon indicating a direction to move the mobile telecommunications device.

13. The method of claim 10, wherein providing further comprises:
    providing, by the session controller, the command comprising an icon indicating to zoom in on an object.

14. The method of claim 10, further comprising:
identifying, by the session controller, a remote support technician device;
generating, by the session controller a code to pair the mobile telecommunications device with the remote support technician device; and
storing, by the session controller, in an index, the code for the real-time communication session and an indication of the remote support technician device paired with the mobile telecommunications device.

15. The method of claim 10, wherein generating further comprises:
generating, by the session controller, a link including an indication of a numerical code for the real-time communication session.

16. The method of claim 10, further comprising:
selecting, by the session controller, a server to manage the real-time communication session; and
establishing, by the session controller, the data feed between the camera sensor of the mobile telecommunications device and a remote support technician device via the selected server.

17. The method of claim 10, further comprising:
establishing, by the session controller, via a web socket over a network protocol, the real-time communication session between the mobile telecommunications device and a remote support technician device.

18. The method of claim 10, further comprising:
adding, by the session controller, a remote support technician device to the real-time communication session via the web socket over the network protocol.

* * * * *